(12) United States Patent
Van Laar et al.

(10) Patent No.: US 10,899,035 B2
(45) Date of Patent: Jan. 26, 2021

(54) APPARATUS FOR MAKING TYRES AND METHOD FOR JOINING OR CUTTING TIRE COMPONENTS

(71) Applicant: VMI HOLLAND B.V., Epe (NL)

(72) Inventors: Gerardus Johannes Catharina Van Laar, Epe (NL); Gerrit Roy Nijland, Epe (NL); Cornelis-Jan Otto, Epe (NL); Dries Vis, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/758,817

(22) PCT Filed: Oct. 15, 2018

(86) PCT No.: PCT/NL2018/050674
§ 371 (c)(1),
(2) Date: Apr. 23, 2020

(87) PCT Pub. No.: WO2019/083355
PCT Pub. Date: May 2, 2019

(65) Prior Publication Data
US 2020/0316808 A1 Oct. 8, 2020

(30) Foreign Application Priority Data

Oct. 23, 2017 (NL) .................................... 2019785

(51) Int. Cl.
*B26D 7/26* (2006.01)
*B29C 65/00* (2006.01)
(Continued)

(52) U.S. Cl.
CPC ............ *B26D 7/2628* (2013.01); *B29C 66/71* (2013.01); *B26D 2001/006* (2013.01);
(Continued)

(58) Field of Classification Search
CPC ............ B26D 7/2628; B26D 2001/006; B29C 66/71; B29C 65/7841; B29C 66/8242;
(Continued)

(56) References Cited

U.S. PATENT DOCUMENTS

| 2,922,458 A | * | 1/1960 | Jensen | ................... B23D 15/08 |
| | | | | 72/330 |
| 3,857,316 A | * | 12/1974 | Handley | ................. B26D 1/085 |
| | | | | 83/644 |
| 4,664,007 A | * | 5/1987 | Tokukatsu | ............. B02C 18/02 |
| | | | | 83/373 |

FOREIGN PATENT DOCUMENTS

| CN | 20126120 | * | 6/2009 | |
| CN | 102069232 | | 5/2011 | ............. B23D 15/08 |

(Continued)

OTHER PUBLICATIONS

CN20126120—Machine Translation of Description (Year: 2020).*
(Continued)

*Primary Examiner* — Christopher T Schatz
*Assistant Examiner* — Cynthia L Schaller
(74) *Attorney, Agent, or Firm* — Hayes Soloway P.C.

(57) ABSTRACT

Disclosed is a tire building apparatus and a method for joining or cutting tire components. The tire building apparatus includes a rocking member that is movable in a rocking plane in a rocking motion along a rocking line, a translation guide extending parallel to the rocking line and a carriage that is displaceable along the translation guide, wherein the rocking member has a convex edge that defines a minor arc of a circle and extends up to a rotation center, wherein the rocking member is supported by the carriage at the rotation center and is angularly displaceable with respect to the carriage about a rotation axis extending through the rotation center.

24 Claims, 6 Drawing Sheets

(51) Int. Cl.
  *B26D 1/00* (2006.01)
  *B29C 65/78* (2006.01)
  *B29D 30/46* (2006.01)
  *B29D 30/42* (2006.01)
  *B29L 30/00* (2006.01)

(52) U.S. Cl.
  CPC ...... *B29C 65/7841* (2013.01); *B29C 66/8242* (2013.01); *B29D 30/46* (2013.01); *B29D 2030/427* (2013.01); *B29D 2030/463* (2013.01); *B29L 2030/00* (2013.01)

(58) Field of Classification Search
  CPC .......... B29L 2030/00; B29D 2030/427; B29D 2030/463; B29D 30/46
  USPC .................................................... 83/644, 373
  See application file for complete search history.

(56) References Cited

FOREIGN PATENT DOCUMENTS

| JP | 2008296343 | * 11/2008 | |
| JP | 2013-35139 | 2/2013 | ............. B29D 30/32 |
| WO | WO2016/007001 | 1/2016 | ............... B26D 3/00 |
| WO | WO2017/105220 | 6/2017 | ............. B29D 30/42 |

OTHER PUBLICATIONS

JP2008296343 Machine Translation of Description (Year: 2020).*
Decision to Grant issued in related Korean Patent Application Sereial No. 10-2019-7015731, dated Mar. 13, 2020 with translation (6 pages).
International Search Report and Written Opinion issued in underlying PCT International Patent Application Serial No. PCT/NL2018/050674, dated Mar. 15, 2019 (8 pages).

* cited by examiner

APPARATUS FOR MAKING TYRES AND METHOD FOR JOINING OR CUTTING TIRE COMPONENTS

BACKGROUND

The invention relates to a tire building apparatus and a method for joining or cutting tire components.

WO 2016/007001 A1 discloses a cutting device for cutting tire components, wherein the cutting device comprises an upper cutting member with an arcuate upper cutting edge that is arranged to be moved in a rocking motion along a lower cutting member, wherein the arcuate upper cutting edge has a radius and a rotation center for the rocking motion at the origin of said radius, wherein the rotation center is located outside the upper cutting member.

WO 2017/105220 A1 discloses a joining apparatus for joining tire components on a support member, wherein the joining apparatus comprises a first rocking member with an arcuate pressing body. The arcuate pressing body has a convex contact surface with a radius that defines a rotation center that is again located outside the first rocking member, wherein the first rocking member is arranged to move in a rocking motion in the rocking plane about said rotation center.

In both cases, the location of the rotation center is no longer physically restricted and the radius can be increased significantly. Hence, bulging of the material can be prevented and the quality of the cutting or the joining can be increased.

SUMMARY OF THE INVENTION

A disadvantage common to both the known cutting device and the known joining apparatus is that, in the absence of a physical rotation center, the complex rocking motion has to be guided by several decentralized guides. In both cases, the rocking motion is imposed onto the rocking member through interaction between an arcuate drive rail and drive wheels running over said arcuate drive rail. Meanwhile additional guides are required to guide the motion of endpoints of the rocking member along respective cycloid paths. Any inaccuracies between the drive wheels, the arcuate drive rail and said guides result in friction, torsion and/or tension between the various components of the device, which reduces the lifespan of said components. The friction can be reduced by lubrication. However, the lubricant may contaminate the material of the tire components.

It is an object of the present invention to provide a tire building apparatus and a method for joining or cutting tire components, wherein at least one of the abovementioned disadvantages is addressed.

According to a first aspect, the invention provides a tire building apparatus for joining or cutting tire components, wherein the tire building apparatus comprises a rocking member that is movable in a rocking plane in a rocking motion along a rocking line to join or cut tire components, wherein the tire building apparatus comprises a translation guide extending in a translation direction parallel to the rocking line and a carriage that is translationally displaceable in said translation direction along said translation guide, wherein the rocking member comprises a main body that at one end has a convex edge that defines a minor arc of a circle and at the other end extends at least up to a rotation center concentric to said circle, wherein the rocking member is supported by the carriage at the rotation center and angularly displaceable with respect to said carriage about a rotation axis extending perpendicular to the rocking plane through said rotation center.

In some cases where a very large radius between the convex edge and the rotation center is required, it may not be possible to physically connect the rocking member at the rotation center to the carriage. In these cases, the prior art apparatuses can be used and the disadvantages thereof are taken for granted. The present invention is directed at those specific cases where the requirements of the tire building process allow for a smaller radius to be used or where the size of the apparatus is not an issue. In those cases, having a rocking member extending physically up to the rotation center and being supported by the carriage at the rotation center allows for a more accurate coupling to be made. As the friction and tolerances at said coupling can be reduced, less lubrication is required and the chances of contaminating the material of the tire components can be reduced significantly.

In a preferred embodiment the tire building apparatus comprises a rotation guide for controlling the angular displacement of the rocking member about the rotation axis that in combination with the translational displacement of the carriage in the translation direction results in the rocking motion. The shape of the rocking member with respect rotation center means that its center of mass will shift during the rocking motion. The rotation guide is provided to ensure a proper and/or constant rotation of the rocking member with respect to the translational displacement, regardless of the varying position of its center of mass. In doing so, the rotation guide can further control or reduce slippage of the rocking member with respect to the tire components at the rocking line.

In a preferred embodiment the rotation guide is arranged for controlling the angular displacement of the rocking member in radians in a ratio to the translational displacement of the carriage in radians of 1:1. Hence, slippage between the rocking member and the tire components at the rocking line can be effectively prevented.

In an alternative embodiment the rotation guide is arranged for controlling the angular displacement of the rocking member in radians in a ratio to the translational displacement of the carriage in radians within a range of 1:0,9 to 1:1,1. Slightly deviating from the 1:1 ratio can generate a small amount of slippage, the friction of which can be used to exert a (small) directional force onto the tire components, e.g. to obtain a better splice, to prevent protrusions or indents at the transition between spliced tire components or to prevent splitting of the materials.

In a further embodiment thereof the rotation guide is arranged for variably controlling the ratio between the angular displacement of the rocking member in radians and the translational displacement of the carriage in radians during the rocking motion. Hence, the slippage and the friction resulting therefrom can be variably controlled throughout the rocking motion.

In another embodiment the rotation guide comprises an actuator for providing a control motion and a connecting member that connects the actuator to the rocking member for imposing said control motion onto the rocking member. The rotation guide can thus actively control the rotation of the rocking member.

In an embodiment thereof the actuator is a rotary actuator for providing a rotary control motion, wherein the rotation guide comprises a crankshaft that converts the rotary control motion into a reciprocating control motion. The reciprocating control motion can be effectively used to accurately control the rocking motion.

In a further embodiment thereof the connecting member further comprises a rod that connects the crankshaft to the rocking member at a control point spaced apart from the rotation center. The reciprocating control motion can thus be imposed on said control point to make said control point move along a cycloid or substantially cycloid path.

Preferably, the rod is arranged for causing the control point to move along a cycloid path during the rocking motion, wherein the control point is arranged to move through a cusp in the cycloid path during the rocking motion. When the control point moves through the cusp in the cycloid path, the direction of movement of the control point is inverted at the cusp and the cycloid path travelled by the control point before and after the cusp are relatively close together, thereby more effectively using the range of the crankshaft.

In an alternative embodiment the rotation guide comprises a guide slot or a guide ridge that is in a fixed position relative to the translation guide, wherein the rotation guide further comprises a guide roller that is spaced apart from the rotation center in a fixed position relative to the rocking member and that is arranged to engage with and follow the guide slot or the guide ridge during the translational displacement of the carriage in the translation direction. Preferably, the guide slot or the guide ridge extends along a cycloid path to be followed by the guide roller during the rocking motion. The interaction between the guide slot or the guide ridge and the guide roller can be seen as a passive control of the rotation, meaning that the rotation can be controlled by the rotation guide without any actively driven parts.

In a further embodiment the tire building apparatus further comprises a height adjustment guide extending in a height direction perpendicular to the rocking line, wherein the rocking member is movable in said height direction along said height adjustment guide. Hence, the gap between the rocking member and a support member for supporting the tire components at the rocking line can be adjusted, thereby allowing for the tire building apparatus to be adjusted for various thicknesses of tire components. This is particularly convenient in cases where the support member at the opposite side of the rocking line cannot be adjusted in the height direction.

In an embodiment thereof the height adjustment guide is arranged between the carriage and the rocking member for moving the rocking member in the height direction relative to the carriage. Hence, instead of moving the carriage and the rocking member, only the rocking member has to be lifted.

In an embodiment thereof the tire building apparatus further comprises an abutment member that is fixable in an abutment position relative to the carriage and that is arranged to abut the rocking member in said abutment position at a lower limit for said rocking member. Hence, at least the lower limit of the rocking member with respect to the carriage can be fixed.

In an embodiment thereof the abutment member is adjustable in an adjustment direction parallel or transverse to the height direction to adjust the lower limit for said rocking member. By adjusting the lower limit of the rocking member, the gap between the rocking member and the rocking line in said height direction can be set.

In a preferred embodiment thereof the tire building apparatus further comprises an adjustment member that is in a fixed position relative to the translation guide for contacting the abutment member when the carriage moves to the adjustment member, wherein the adjustment member is arranged for displacing the abutment member in the adjustment direction through said contact. Hence, no actively driven adjustment member is required and the lower limit defined by the abutment member can be easily set by merely moving the carriage relative to the adjustment member.

In a further embodiment the tire building apparatus further comprises a first clamping member and a second clamping member extending parallel to the rocking line at opposite sides of the rocking plane for alongside the rocking member holding down the tire components at the rocking line with respect to the rocking member. The clamping member can prevent that the relatively tacky material of the tire components sticks to the rocking member during the rocking motion.

In an embodiment thereof the first clamping member and the second clamping member are movable away from the rocking line. This allows for maintenance or inspection of the tire building apparatus, e.g. when irregularities are detected (for example through the use of a suitable sensor) at the rocking line.

In a preferred embodiment the convex edge is a splicing edge. Hence, the tire building apparatus can be used for joining, splicing or stitching of the tire components.

In an alternative embodiment the convex edge is a cutting edge. Hence, the tire building apparatus can be used for cutting the tire components.

In a further embodiment the rocking member has a radius between the rotation center and the convex edge, wherein the convex edge has a length that is less than two radians. Preferably, the convex edge has a length that is less than one radian. Hence, the convex edge only spans a partial circumference of the circle.

According to a second aspect, the invention provides a method for joining or cutting tire components using the tire building apparatus according to any one of the aforementioned embodiments, wherein the method comprises the steps of:

supporting one or more tire components at the rocking line; and translationally displacing the carriage in the translation direction along the translation guide.

The method and its embodiments relate to the use of the aforementioned tire building apparatus and thus have the same technical advantages, which will not be repeated hereafter.

In a preferred embodiment of the method, the tire building drum further comprises a rotation guide, wherein the method further comprises the step of using the rotation guide to control the angular displacement of the rocking member about the rotation axis that in combination with the translational displacement of the carriage in the translation direction results in the rocking motion.

In a preferred embodiment of the method the angular displacement of the rocking member in radians is controlled in a ratio to the translational displacement of the carriage in radians of 1:1.

In an alternative embodiment of the method the angular displacement of the rocking member in radians is controlled in a ratio to the translational displacement of the carriage in radians within a range of 1:0,9 to 1:1,1.

In a preferred embodiment thereof the ratio between the angular displacement of the rocking member in radians and the translational displacement of the carriage in radians is variably controlled during the rocking motion.

In another embodiment of the method the convex edge is a splicing edge, wherein the method comprises the step of splicing the tire components with said rocking motion.

In an alternative embodiment of the method the convex edge is a cutting edge, wherein the method comprises the step of cutting a tire component with said rocking motion.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
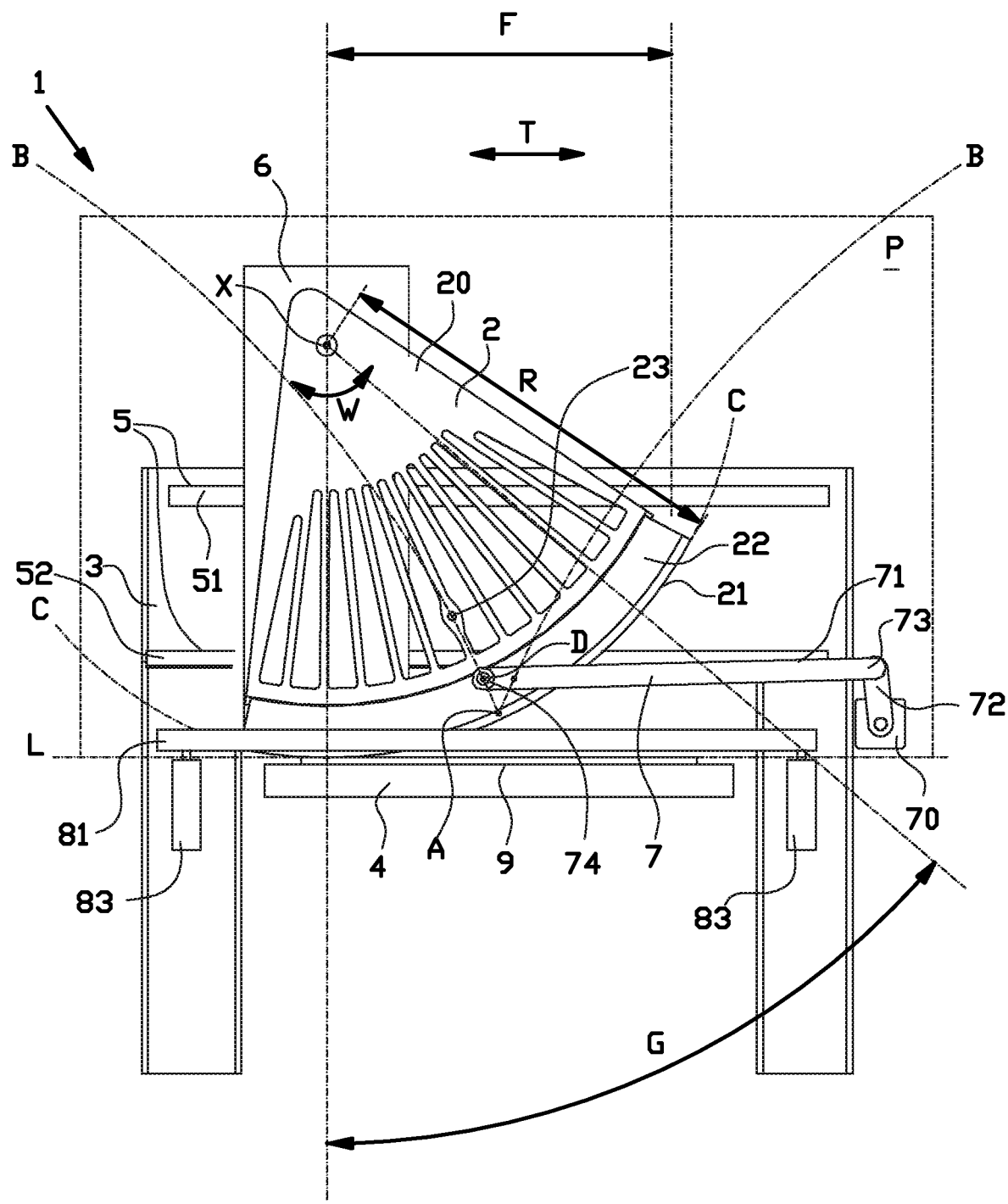
FIGS. 1, 2 and 3 show front views of a tire building apparatus for joining or cutting tire components according to a first embodiment of the invention during the steps of a rocking motion.

FIG. 1 shows a tire building apparatus 1 for joining, stitching or splicing one or more tire components 9 according to a first embodiment of the invention. Alternatively, with a slightly different configuration, the tire building apparatus 1 according to the first embodiment of the invention can be used for cutting one or more tire components 9.

Figure 2:
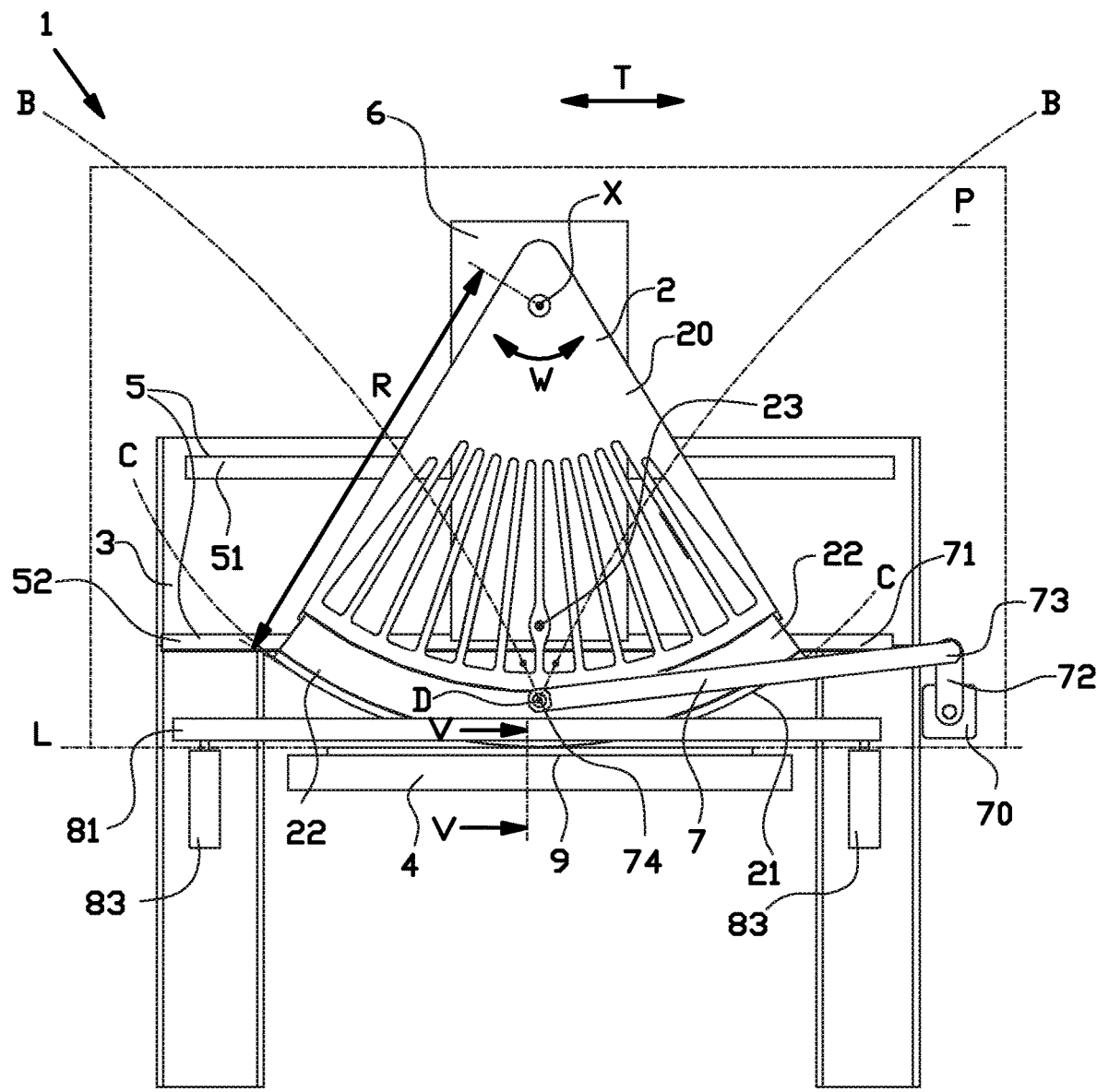
Figure 3:
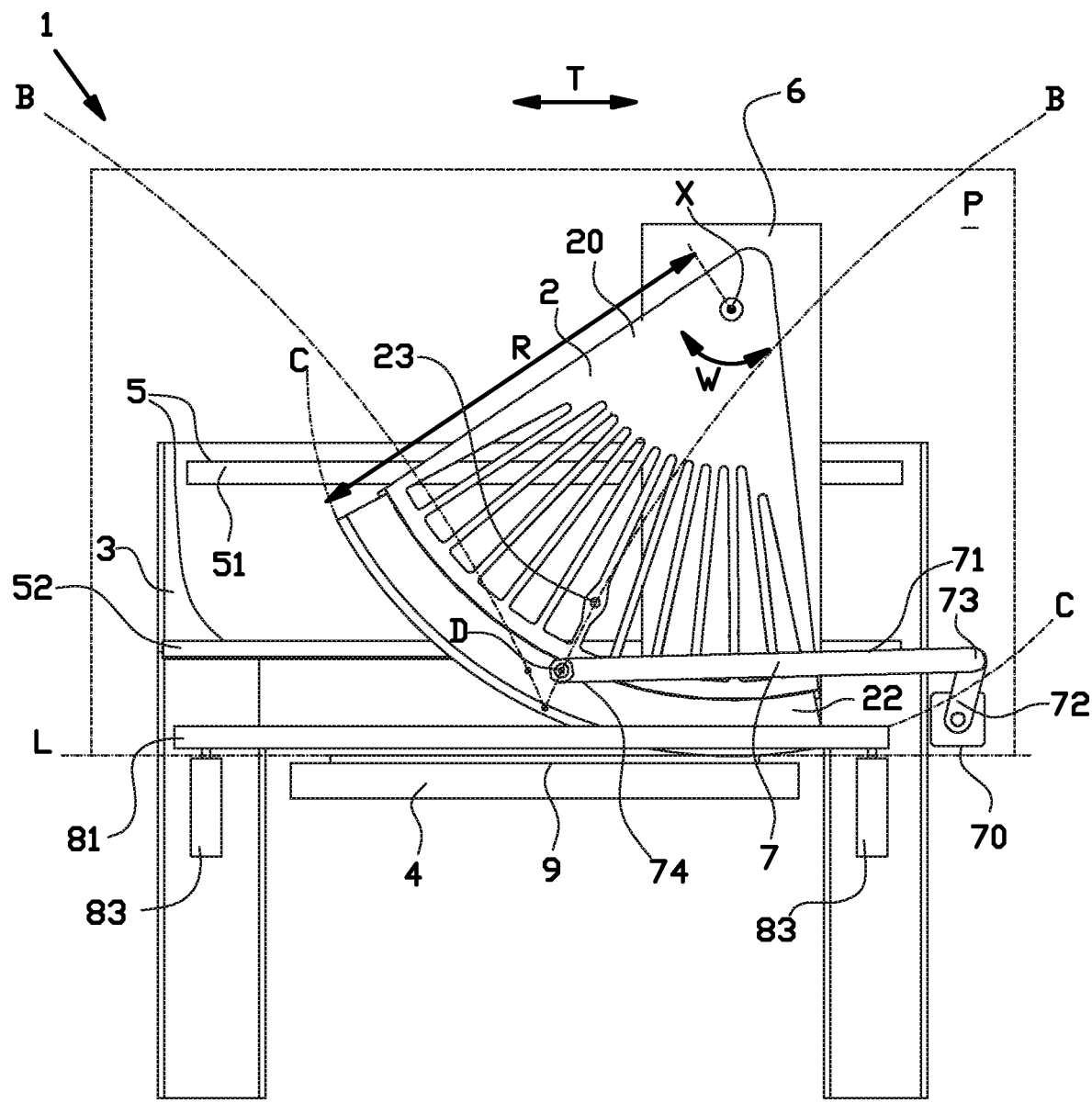

As shown in FIGS. 1, 2 and 3, the tire building apparatus 1 comprises a rocking member 2 and a base 3, e.g. a frame, for supporting said rocking member 2, e.g. on a factory floor. The rocking member 2 is movable with respect to the base 3 in a rocking plane P in a rocking motion along a rocking line L. The rocking motion is a partial or reciprocating rolling motion of the rocking member 2 over the rocking line L. At an opposite side of the rocking line L with respect to the rocking member 2, a support member 4 is provided for supporting the one or more tire components 9 at the rocking line L. The support member 4 may for example be a conveyor that feeds tire components 9 from an upstream station towards the tire building apparatus 1 for joining or cutting. Alternatively, the support member 4 can be a table or platform associated with the tire building apparatus 1 for in cooperation with the rocking member 2 joining tire components 9. When cutting tire components 9, the support member 4 may be a stationary cutting bar that cooperates with the rocking member 2 to cut a tire component 9.

As best seen in FIGS. 1, 2 and 3, the rocking member 2 comprises a main body 20 which at one end features a convex edge 21 that defines and/or extends along a minor arc of a circle C. A minor arc is generally understood as a closed circular segment of a circle that is smaller than a semicircle, e.g. less than 180 degrees or less than Pi radians. Hence, the convex edge 21 has a circumferential length of less than 180 degrees or less than Pi radians. Preferably, the circumferential length of the convex edge 21 is less than two radians and most preferably less than one radian. At the other end, opposite to the convex edge 21, the main body 2 extends at least up to a rotation center X concentrically located with respect to said circle C. In particular, the main body 2 extends at least over a radius R from the convex edge 21 up to the rotation center X to physically connect the convex edge 21 to said rotation center X. In this exemplary embodiment, the main body 20 of the rocking member 2 substantially resembles a pie-shaped section of the circle C. The main body 20 may however be alternatively shaped, e.g. for reasons of weight reduction or compactness, provided that the convex edge 21 at the end thereof is maintained. The main body 20 may for example be provided with holes or slots, as shown in FIGS. 1-3, to reduce the overall weight of the rocking member 2.

Figure 5:
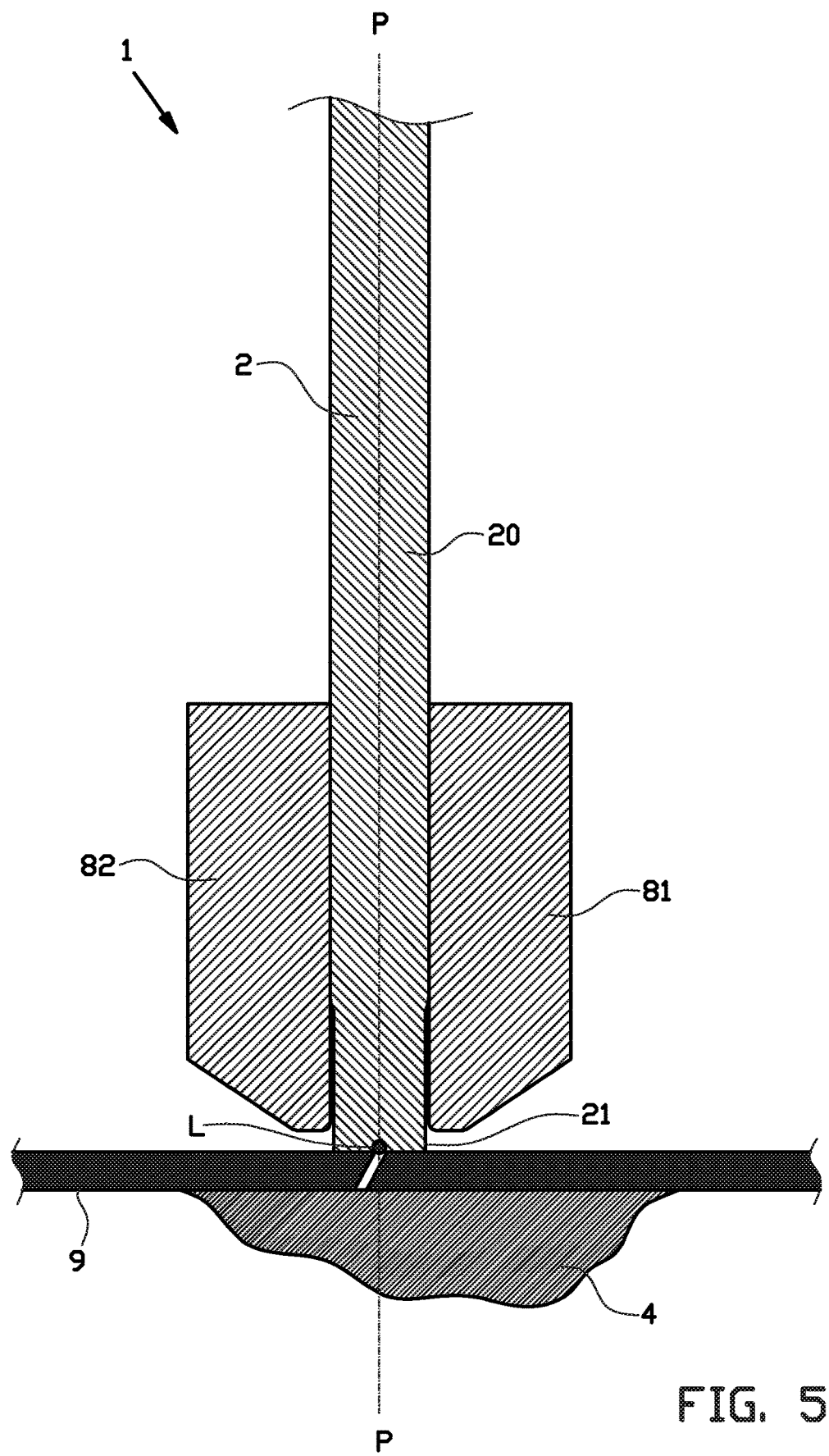
FIG. 5 shows a cross section of the tire building apparatus according to line V-V in FIG. 2.

As shown in cross section in FIG. 5, the convex edge 21 of the rocking member 2 is formed by a convex pressing surface for joining, stitching or splicing tire components 9. Alternatively, the convex edge 21 may be formed as a cutting edge or a knife edge for the purpose of cutting tire components 9. As best seen in FIGS. 1-3, the convex edge 21 may be part of an annular element 22 that is detachably mounted to the main body 20 of the rocking member 2 and that can be interchanged easily for maintenance or when switching between a joining and a cutting operation.

Optionally, the rocking member 2 may further be provided with a calibration element 23 for calibration the center position of the rocking member 2 in a manner that will be described later.

As shown in FIGS. 1, 2 and 3, the tire building apparatus 1 is provided with a translation guide 5 that is fixedly mounted to the base 3 and that extends in a translation direction T parallel to the rocking line L. In this exemplary embodiment, the translation guide 5 is formed by two linearly extending slide rails 51, 52. The tire building apparatus 1 further comprises a carriage 6 that is translationally displaceable in said translation direction T along said translation guide 5. The translational displacement of the carriage 6 in the translation direction T between the extreme positions in FIGS. 1 and 3 is schematically shown with distance arrow F in FIG. 1. The carriage 6 is arranged for supporting the rocking member 2 at the rotation center X thereof or for suspending the rocking member 2 from its rotation center X. The rocking member 2 is rotatably coupled to the carriage 6 at the rotation center X so as to be angularly displaceable with respect to said carriage 6 in a rotation direction W about a rotation axis extending perpendicular to the rocking plane P through the rotation center X. The angular displacement is schematically shown in FIG. 1 with angular distance arrow G. The angular displacement G at the convex edge 21 is equal or substantially equal to the distance travelled by said convex edge 21 along the rocking line L, i.e. the length of the tire component(s) pressed or cut by the rocking member 2. As the rotation center X and the rotation axis coincide, they will be both be referenced hereafter with reference letter X. The rotatable coupling may be obtained by providing a bearing or another suitable low-friction rotation mechanism between the rocking member 2 and the carriage 6 at or concentrically near the rotation center X.

As best seen in FIGS. 1, 2 and 3, the tire building apparatus 1 further comprises a rotation guide 7 for controlling the angular displacement G of the rocking member 2 in the rotation direction W about the rotation axis X. In particular, the rotation guide 7 is arranged for controlling said angular displacement in such a way that the angular displacement G in the rotation direction W—in combination with the translational displacement F of the carriage 6 in the translation direction T—results in the desired rocking motion of the rocking member 2. To obtain a perfect rocking motion with no slip of the convex edge 21 with respect to the rocking line L, the rotation guide 7 should be configured to control the angular displacement G in radians to be equal to the translational displacement F in the translation direction T in radians, i.e. in a ratio between the angular displacement G of the rocking member 2 in radians and the translation displacement T of the carriage 6 in radians of 1:1.

The rotation guide 7 comprises an actuator 70 for actively providing a control motion and a connecting member 71, e.g. a rod, that connects the actuator 70 to the rocking member 2 for imposing the control motion onto the rocking member 2. The connecting member 71 preferably extends in or parallel to the rocking plane P, in a direction more or less parallel to the translation direction T, towards the actuator 70 which is preferably located at a side of the rocking member 2 in the translation direction T. The actuator 70 is preferably controllable so that the control motion can be adjusted. Hence, the actuator 70 can facilitate a (slight) deviation from the perfect rocking motion, e.g. within a range of 10 percent, to allow for some friction to be generated between the convex edge 21 and the tire components 9 at the rocking line L. Said friction can be conveniently used exert a (small) directional force on the tire components 9 in a direction parallel or substantially parallel to the rocking line L. For example, the actuator 70 may control the ratio between the angular displacement G of the rocking member 2 in radians and the translational displacement F of the carriage 6 in radians within a range of 1:0,9 to 1:1,1.

Preferably, the actuator 70 is continuously adjustable, e.g. by using a servomotor, for variably controlling the ratio between the angular displacement G of the rocking member 2 in radians and the translational displacement F of the carriage 6 in radians during the rocking motion. Hence, the aforementioned ratio may be adjusted continuously during the rocking motion or a part thereof. The ratio may for example be adjusted when the rocking member 2 approaches or moves over an edge of the material of the one or more tire components 9, e.g. to prevent the formation of so-called 'dog ears' during the joining of the tip sections of the tire components.

In this exemplary embodiment, the actuator 70 is a rotary actuator for providing a rotary control motion. Consequently, the rotation guide 7 comprises a crankshaft that converts the rotary control motion into a reciprocating control motion and the connecting member 71 is a suitably shaped, rigid bar with a first end 73 that is hingably connected to the crankshaft 72 and a second end 74 that is hingably connected to the rocking member 2 at a control point D. Note that the control point D travels a cycloid path B while guiding the rocking motion of the rocking member 2 between the positions as shown in FIGS. 1, 2 and 3. Preferably, said control point D moves through a cusp A in the cycloid path B during the rocking motion. In this exemplary embodiment, the cusp A is located at the center position of the rocking member 2.

To calibrate the center position of the actuator with respect to the center position of the rocking member 2, the rocking member 2 is allowed to return to the center position of FIG. 2, e.g. under the influence of gravity. When the rocking member 2 is rotated into the center position, the aforementioned calibration element 23 is used to temporarily fix the rocking member 2 against rotation about the rotation center X. In this exemplary embodiment, the calibration element 23 is a pin that is to be inserted into a corresponding calibration hole (not shown) at the carriage 6. When the center position of the rocking member 2 is fixed, the actuator 70 can be accurately calibrated. After the calibration, the calibration element 23 is removed and the rocking member 2 is rotatable again about the rotation center X.

Figure 4:
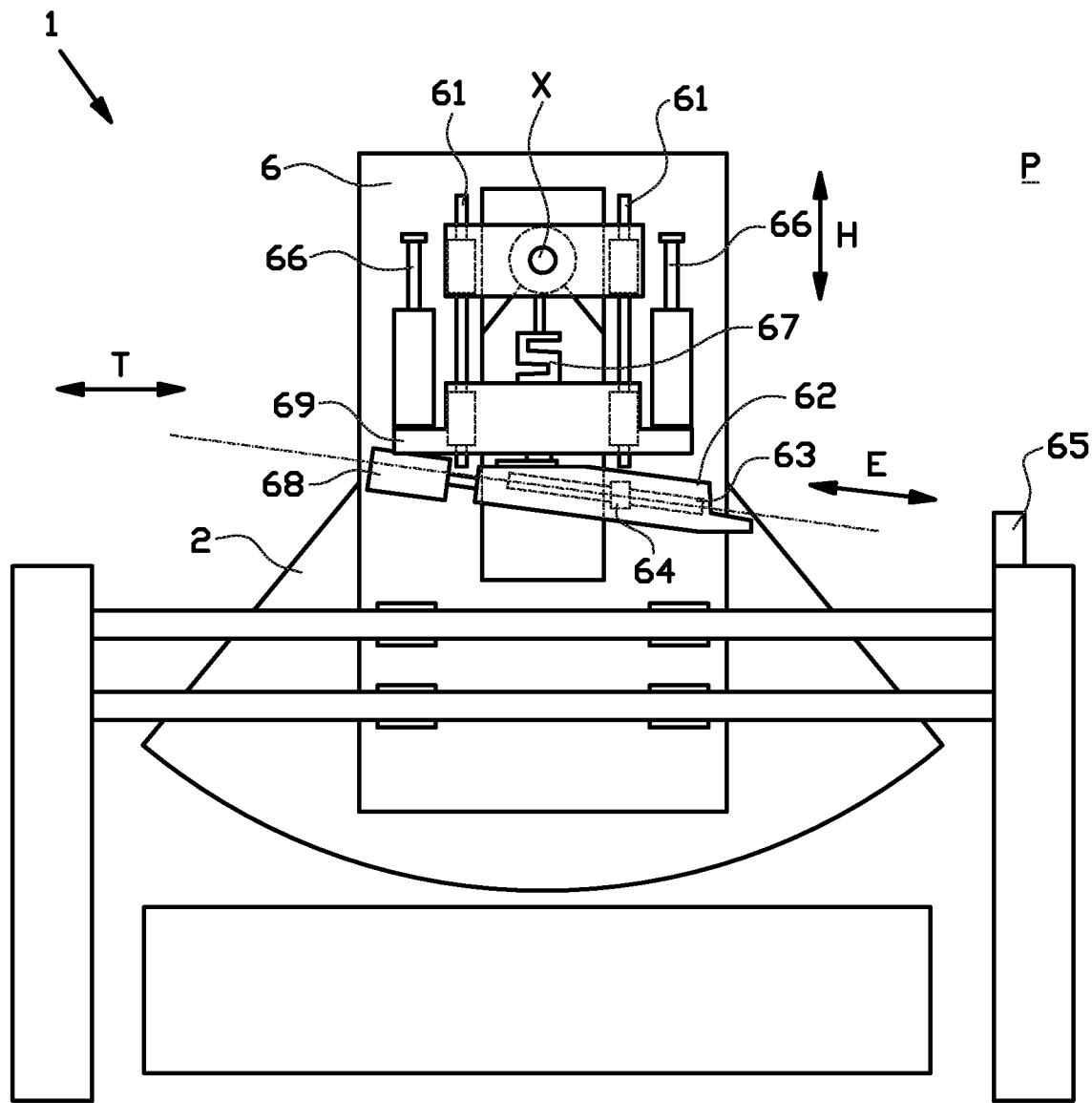
FIG. 4 shows a rear view of the tire building apparatus according to FIG. 2.

As shown in the rear view of FIG. 4, the tire building apparatus 1 is provided with a height adjustment guide 61 extending in a height direction H perpendicular to the rocking line L between the carriage 6 and the rocking member 2. In this exemplary embodiment, the height adjustment guide 61 is formed by two slide rails. The rocking member 2 is movable in said height direction H along said height adjustment guide 61 to adjust the height of the rocking member 2 relative to the carriage 6. In particular, by moving the rocking member 2 in the height direction H, the gap between the convex edge 21 and the support member 4 in FIGS. 1, 2 and 3 can be adjusted to accommodate various thicknesses of tire components 9 during a joining operation. When cutting tire components, the height of the rocking member 2 may be adjusted such that the convex edge 21 is at an adjustable overlap or a negative gap with the support member 4, e.g. a cutting bar, in the height direction H.

As further shown in FIG. 4, the tire building apparatus 1 comprises an abutment member 62 that is fixable in an abutment position relative to the carriage 6. The abutment member 62 is arranged to abut the rocking member 2 in said abutment position at a lower limit for said rocking member 2. The abutment member 62 is adjustable in an adjustment direction E parallel or transverse to the height direction H to adjust the lower limit for said rocking member 2. In this exemplary embodiment, the abutment member is a wedge shaped plate that is movable along an adjustment rail 63 extending in the adjustment direction E. Preferably, the abutment member 62 is freely movable along the adjustment rail 63 until its position is fixed by a brake member 64. Optionally, the abutment member 62 may be biased by a biasing member 68 to move to the lowest position on the adjustment rail 63. As shown in FIG. 4, an adjustment member 65 is provided for adjusting the position of the freely movable abutment member 62. The adjustment member 65 is in a fixed position relative to the translation guide 5 for contacting the abutment member 62 when the carriage 6 moves towards the adjustment member 65. Upon contact between the adjustment member 65 and the abutment member 62 in the translation direction T, the adjustment member 65 is arranged for displacing the abutment member 62 in the adjustment direction E through said contact. The abutment member 62 can subsequently be fixed in the position set through said contact by activating the brake member 64.

Optionally, the abutment member 62 can be positioned actively by an abutment control, e.g. if the biasing member 68 is replaced by a linear drive that engages directly onto the abutment member 62.

It is further noted that FIG. 4 shows one or more pistons 66 for actively setting the position of the rocking member 2 in the height direction H. In this exemplary embodiment, the one or more pistons 66 are placed between the carriage 6 and a height adjustment bracket 69 which carries the height adjustment guide 61. Said one or more pistons 66 may also be used as a failsafe to absorb movement of the rocking member 2 in the height direction H, e.g. when an irregularity is encountered in the tire components 9. FIG. 4 further shows an optional load cell 67 between the height adjustment bracket 69 and the height adjustment guide 61 for detecting the load on the rocking member 2. The load cell 67 can be operationally connected to the one or more pistons 66 for variably adjusting the height of the rocking member 2 in the height direction H in response to the signals of the load cell 67.

As best seen in cross section in FIG. 5, the tire building apparatus 1 further comprises a first clamping member 81 and a second clamping member 82 extending parallel to the rocking line L at opposite sides of the rocking plane P. During the rocking motion, the material of the tire components 9, which may still be tacky, tends to stick to the rocking member 2. As a consequence, the tire components 9 may be at least partially lifted from the support member 4, which could potentially decrease the quality of the joining or cutting. The clamping members 81, 82 are arranged for at least partially mitigating these negative effects by holding down the tire components 9 alongside the rocking member 2 at the rocking line L. In the position as shown, the clamping member 81, 82 can effectively peel off the tire components 9 from the rocking member 2. As shown in FIGS. 1, 2 and 3, the clamping members 81 (82 hidden from view) are mounted on a retraction drive 83, e.g. a set of pneumatic cylinders, to retract or lift the clamping members 81, 82 away from the support member 4 at the rocking line L, e.g. for inspection or maintenance purposes.

Figure 6:
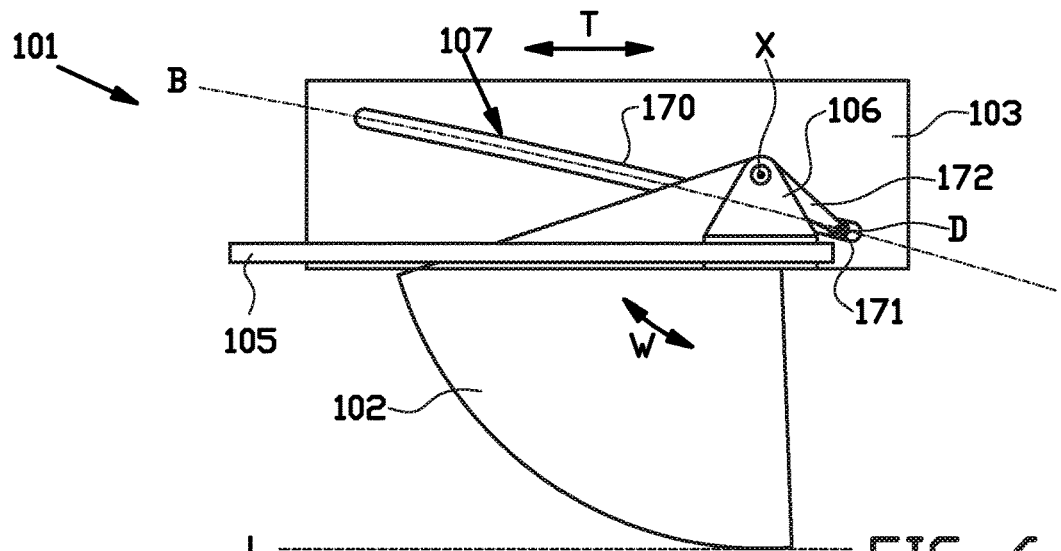
FIGS. 6, 7 and 8 show front views of an alternative tire building apparatus for joining or cutting tire components according to a second embodiment of the invention during the steps of a rocking motion.
Figure 7:
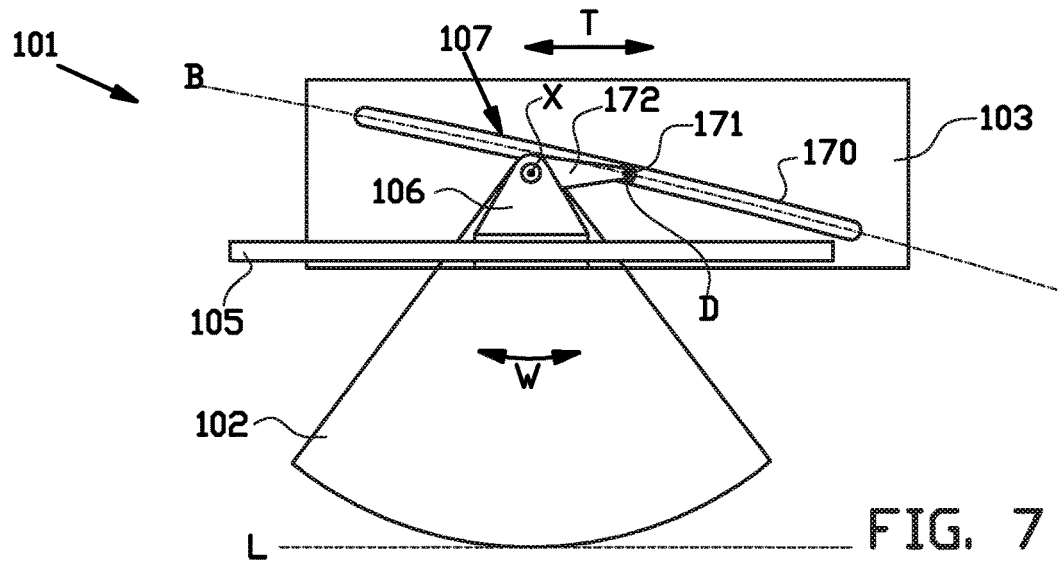
Figure 8:
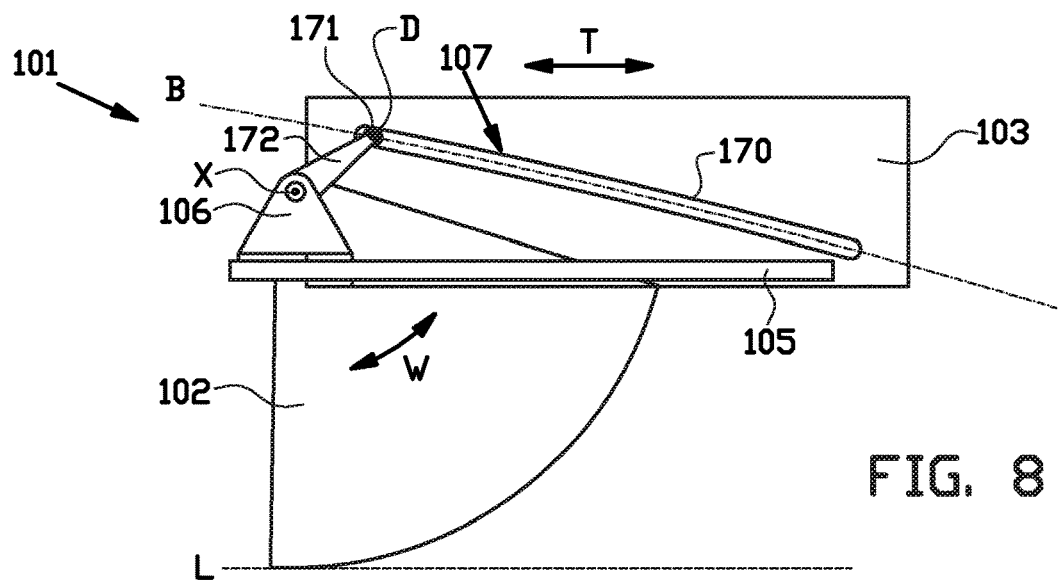

FIGS. 6, 7 and 8 show an alternative tire building apparatus 101 according to a second embodiment of the invention. The alternative tire building apparatus 101 differs from the tire building apparatus 1 according to the first embodiment of the invention in that it has an alternative rotation guide 107. Said alternative rotation guide 107 comprises a guide slot or a guide ridge 170 that is in a fixed position relative to the translation guide 105. The rocking member 102 is again supported by a carriage 106 that is translationally displaceable over said translation guide 105 in the translation direction T. However, the rotation guide 107 further comprises a guide roller 171 that is spaced apart from the rotation center X in a fixed position relative to the rocking member 102. Preferably, the guide roller 171 is arranged at the distal end of a guide arm 172 that is rigidly connected to the rocking member 102. The guide roller 171 is arranged to engage with and follow the guide slot or guide ridge 170 during the translational displacement F of the carriage 106 in the translation direction T. The guide slot or guide ridge 170 extends along a cycloid path B that is to be followed by said guide roller 171 in order to effectuate the desired rocking motion.

Different shapes and/or number of guide slots and/or guide ridges may be used, as long as they guide points of the rocking member 102 along respective cycloid paths.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, it will be apparent to one skilled in the art that the alternative configurations as disclosed in WO 2016/007001 A1 and WO 2017/105220 A1, e.g. replacing the support member by a further rocking member opposite to and cooperating with the aforementioned rocking member, having two rocking members at the same side of the rocking line, yet in different rocking planes under oblique angles with respect to a normal plane, or cooperating with a cylindrical support member, e.g. a drum, will be equally applicable to the tire building apparatuses 1, 101 according to the present invention.

LIST OF REFERENCE NUMERALS 1 tire building apparatus
2 rocking member
20 main body
21 convex edge
22 annular element
23 calibration element
3 base
4 support member
5 translation guide
51 slide rail
52 slide rail
6 carriage
61 height adjustment guide
62 abutment member
63 adjustment rail
64 brake member
65 adjustment member
66 piston
67 load cell
68 biasing member
69 height adjustment bracket
7 rotation guide
70 actuator
71 connecting member
72 crankshaft
73 first end
74 second end
81 first clamping member
82 second clamping member
9 tire component
101 alternative tire building apparatus
102 rocking member
103 base
105 translation guide
106 carriage
107 alternative rotation guide
170 guide slot or guide ridge
171 guide roller
172 guide arm
A cusp
B cycloid path
C circle
D control point
E adjustment direction
F translational displacement
G angular displacement
H height direction
L rocking line
P rocking plane
R radius
T translation direction
W rotation direction
X rotation center

The invention claimed is:

1. A tire building apparatus for joining or cutting tire components, wherein the tire building apparatus comprises a rocking member that is movable in a rocking plane in a rocking motion along a rocking line to join or cut tire components, wherein the tire building apparatus comprises a translation guide extending in a translation direction parallel to the rocking line and a carriage that is translationally displaceable in said translation direction along said translation guide, wherein the rocking member comprises a main body that at one end has a convex edge that defines a minor arc of a circle and at an other end extends at least up to a rotation center concentric to said circle, wherein the rocking member is supported by the carriage at the rotation center and is movable in an angular displacement with respect to said carriage about a rotation axis extending perpendicular to the rocking plane through said rotation center, wherein the tire building apparatus further comprises a rotation guide for controlling the angular displacement of the rocking member about the rotation axis that in combination with the translational displacement of the carriage in the translation direction results in the rocking motion, wherein the rotation guide comprises an actuator for providing a control motion and a connecting member that connects the actuator to the rocking member for imposing said control motion onto the rocking member.

2. The tire building apparatus according to claim 1, wherein the rotation guide is arranged for controlling the angular displacement of the rocking member in radians in a ratio to the translational displacement of the carriage in radians of 1:1.

3. The tire building apparatus according to claim 1, wherein the rotation guide is arranged for controlling the angular displacement of the rocking member in radians in a ratio to the translational displacement of the carriage in radians within a range of 1:0.9 to 1:1.1.

4. The tire building apparatus according to claim 3, wherein the rotation guide is arranged for variably controlling the ratio between the angular displacement of the rocking member in radians and the translational displacement of the carriage in radians during the rocking motion.

5. The tire building apparatus according to claim 1, wherein the actuator is a rotary actuator for providing a rotary control motion, wherein the rotation guide comprises a crankshaft that converts the rotary control motion into a reciprocating control motion.

6. The tire building apparatus according to claim 5, wherein the connecting member further comprises a rod that rotatably connects the crankshaft to the rocking member at a control point spaced apart from the rotation center.

7. The tire building apparatus according to claim 6, wherein the rod is arranged for causing the control point to move along a cycloid path during the rocking motion, wherein the control point is arranged to move through a cusp in the cycloid path during the rocking motion.

8. The tire building apparatus according to claim 1, wherein the tire building apparatus further comprises a height adjustment guide extending in a height direction perpendicular to the rocking line, wherein the rocking member is movable in said height direction along said height adjustment guide.

9. The tire building apparatus according to claim 8, wherein the height adjustment guide is arranged between the carriage and the rocking member for moving the rocking member in the height direction relative to the carriage.

10. The tire building apparatus according to claim 9, wherein the tire building apparatus further comprises an abutment member that is fixable in an abutment position relative to the carriage and that is arranged to abut the rocking member in said abutment position at a lower limit for said rocking member.

11. The tire building apparatus according to claim 10, wherein the abutment member is adjustable in an adjustment direction parallel or transverse to the height direction to adjust the lower limit for said rocking member.

12. The tire building apparatus according to claim 11, wherein the tire building apparatus further comprises an adjustment member that is in a fixed position relative to the translation guide for contacting the abutment member when the carriage moves to the adjustment member, wherein the adjustment member is arranged for displacing the abutment member in the adjustment direction through said contact.

13. The tire building apparatus according to claim 1, wherein the tire building apparatus further comprises a first clamping member and a second clamping member extending parallel to the rocking line at opposite sides of the rocking plane for alongside the rocking member holding down the tire components at the rocking line with respect to the rocking member.

14. The tire building apparatus according to claim 13, wherein the first clamping member and the second clamping member are movable away from the rocking line.

15. The tire building apparatus according to claim 1, wherein the convex edge is a splicing edge.

16. The tire building apparatus according to claim 1, wherein the convex edge is a cutting edge.

17. The tire building apparatus according to claim 1, wherein the rocking member has a radius between the rotation center and the convex edge, wherein the convex edge has a length that is less than two radians.

18. The tire building apparatus according to claim 17, wherein the convex edge has a length that is less than one radian.

19. A method for joining or cutting tire components using the tire building apparatus according to claim 1, wherein the method comprises the steps of:
   supporting one or more tire components at the rocking line; and
   translationally displacing the carriage in the translation direction along the translation guide,
   wherein the method further comprises the step of using the rotation guide to control the angular displacement of the rocking member about the rotation axis that in combination with the translational displacement of the carriage in the translation direction results in the rocking motion.

20. The method according to claim 19, wherein the angular displacement of the rocking member in radians is controlled in a ratio to the translational displacement of the carriage in radians of 1:1.

21. The method according to claim 19, wherein the angular displacement of the rocking member in radians is controlled in a ratio to the translational displacement of the carriage in radians within a range of 1:0.9 to 1:1.1.

22. The method according to claim 21, wherein the ratio between the angular displacement of the rocking member in radians and the translational displacement of the carriage in radians is variably controlled during the rocking motion.

23. The method according to claim 19, wherein the convex edge is a splicing edge, wherein the method comprises the step of splicing the tire components with said rocking motion.

24. The method according to claim 19, wherein the convex edge is a cutting edge, wherein the method comprises the step of cutting a tire component with said rocking motion.

* * * * *